United States Patent [19]
Prager

[11] Patent Number: 6,003,025
[45] Date of Patent: Dec. 14, 1999

[54] DATA TRANSFORMER SYSTEM FOR ACCESSING DATABASE INFORMATION

[75] Inventor: Scott Howard Prager, Stratham, N.H.

[73] Assignee: International Business Machines Corporation, Armonk, N.Y.

[21] Appl. No.: 08/976,486

[22] Filed: Nov. 24, 1997

[51] Int. Cl.$^6$ .................................................. G06F 17/30
[52] U.S. Cl. .................................. 707/3; 707/1; 707/100
[58] Field of Search .............................. 395/683; 707/3, 707/1, 100

[56] References Cited

U.S. PATENT DOCUMENTS

| | | | |
|---|---|---|---|
| 5,343,529 | 8/1994 | Goldfine et al. | 380/23 |
| 5,594,899 | 1/1997 | Knudsen et al. | 395/600 |
| 5,634,127 | 5/1997 | Cloud et al. | 709/300 |

*Primary Examiner*—Jack M. Choules
*Assistant Examiner*—Cheryl Lewis
*Attorney, Agent, or Firm*—Hunton & Williams

[57] ABSTRACT

A database accessing system wherein a data transformer is provided to make it possible to access data between one or more different databases storing and retrieving information in a predetermined and heterogeneous format. The system has one or more data providers for accessing information stored in at least one of the databases, each data provider having a set of predetermined entry points and having a unique identifier assigned. One or more data manipulators are provided which call a particular data provider by its identifier and provides the data provider with the set of predetermined entry points associated with that particular data provider and performs some manipulation on the information provided by the data providers. One or more data transformers are also provided which intercept calls intended by data manipulators for data providers and provide the data manipulator the information requested in the format requested. The data transformer, preferably, has a unique identifier and the same entry points as the data provider from which it intercepts calls.

19 Claims, 6 Drawing Sheets

DATA TRANSFORMER SYSTEM FOR ACCESSING DATABASE INFORMATION

FIELD OF THE INVENTION

This invention relates to database access systems and particularly, to systems for accessing data using links.

BACKGROUND OF THE INVENTION

Databases store various types of information. This information may be encoded, sorted and stored by the database so that it can be accessed, or retrieved later. A problem that may arise is that databases encode, sort and store using different schemes, making it difficult for a single system that has access to different databases to retrieve data from one database and store it into another.

The following description pertains to FIG. 1. The data in a database 30 is, usually, manipulated in some fashion. Manipulation of data may be carried out by a data manipulator 10, typically called an "Activity." A data provider/consumer 20, typically called a "Link," may be provided to enable an Activity 10 to access a database 30. In typical operation, an Activity 10 may make a request of one or more Links 20 to perform certain operations, for example, connect to an external system, produce a set of results from a search and read or write data or metadata. Other operations are possible. For example, a list of names can be sorted alphabetically by performing a sorting operation within the database. A problem that may arise is that different databases will perform this operation in different fashions. For example, one database could sort the characters "B/C" as coming before the characters "B–C." Another database might reverse the order of sorting for these characters. Subsequent attempts to access the data in the two databases could then result in a discrepancy in the sorted lists. Another problem that may arise is that different databases may store data in different formats. For example, what one document database stores as a single data element could be stored in a relational database as multiple related elements in different locations. Other problems also exist.

SUMMARY OF THE INVENTION

One object of the invention is to overcome these and other drawbacks of existing systems.

Another object is to provide a generic data transformer to act as an interface between an Activity and a Link without requiring a change in behavior of either the Activity or the Link.

Another object is to provide a data transformer that does not require the writing of duplicative or redundant code to accomplish the same result in many locations and instead allows code to accomplish a functionality to be written once.

Another object is to provide a data transformer that preserves the original format of the data in the database.

To accomplish these and other objects there is presented a database accessing system comprising one or more databases storing information in a predetermined format, one or more data providers for accessing information stored in at least one of the databases, each data provider having a set of predetermined entry points and having a unique identifier assigned, one or more data manipulators which call a particular data provider by its identifier and provides the data provider with the set of predetermined entry points associated with that particular data provider and performs some manipulation on the information provided by the data provider, and one or more data transformers which intercept calls intended by data manipulators for data providers and provide the data manipulator the information requested in the format requested, said data transformer having a unique identifier and the same entry points as the data provider from which it intercepts calls.

DETAILED DESCRIPTION OF THE PREFERRED EMBODIMENTS

Figure 1:
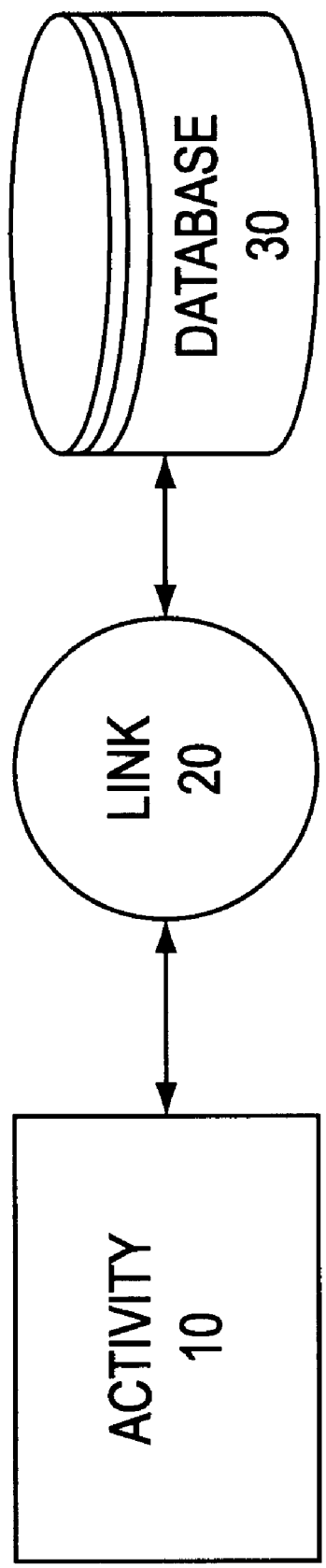
FIG. 1 is a schematic representation of a prior art, database accessing system.
Figure 2:
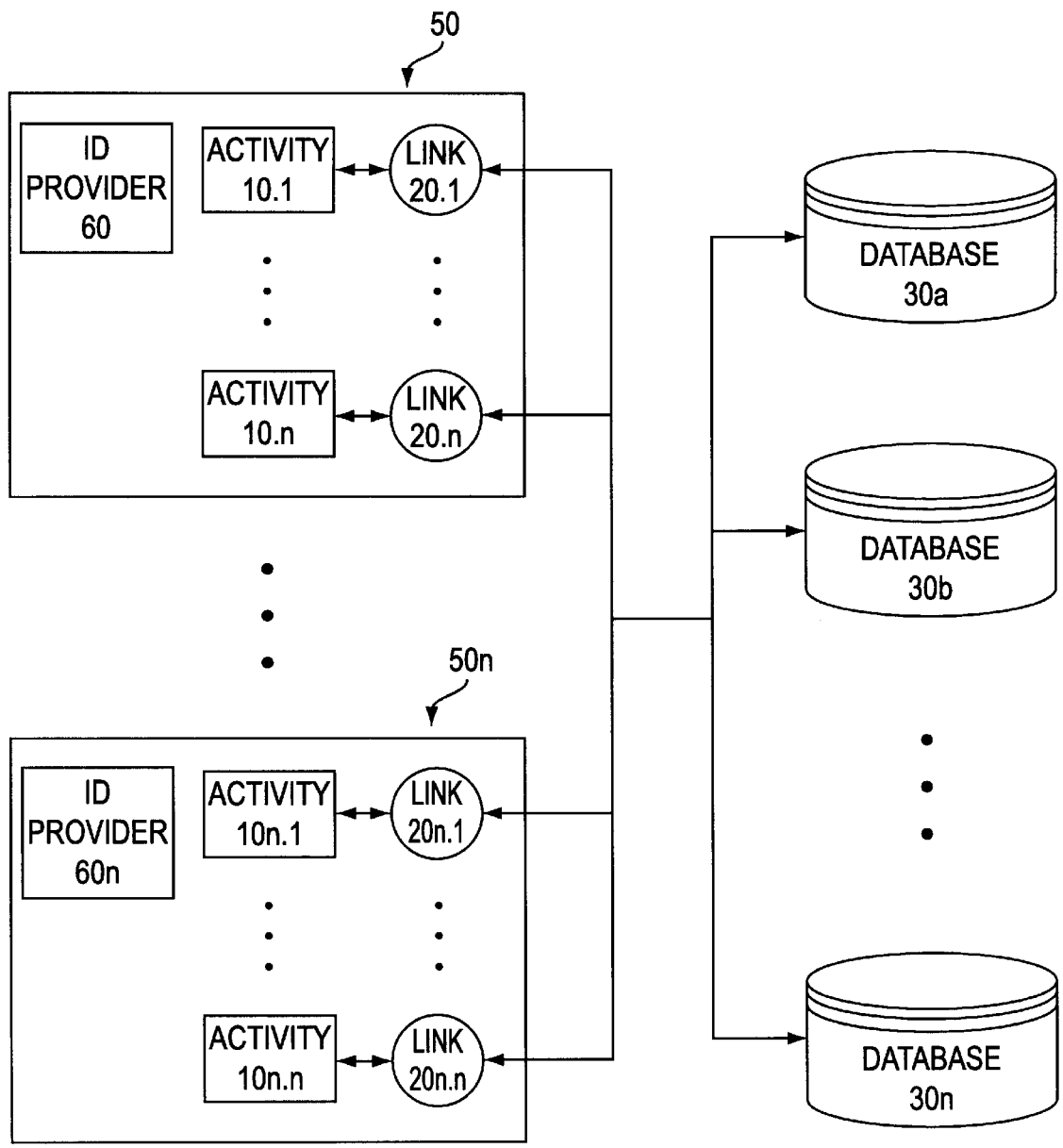
FIG. 2 is a database access system of the prior art.

FIG. 2 represents a general, multiple database accessing configuration. Typically, a system 50 has access to several databases 30a, 30b through 30n. The system 50 may also have access (and be accessible) to other systems 50n. The system 50 or 50n may further comprise numerous Activities 10.1 through 10.n and 10n.1 through 10n.n respectively. The system 50 or 50n further comprises numerous Links 20.1 through 20.n and 20n.1 through 20n.n respectively. The Activities (e.g., 10.1, 10.n, 10n.1 or 10n.n), preferably, access a database (e.g., 30a, 30b, or 30n) through a Link (e.g., 20.1, 20.n, 20n.1 or 20n.n). An Activity, preferably, calls the Link by the specific identifier associated with each Link. Each system 50 or 50n may comprise an Identifier Provider 60 or 60n for providing an Activity with the identifier, or call, for each Link. The above described system is only one example of a database accessing configuration. Other configurations are also possible.

Figure 3:
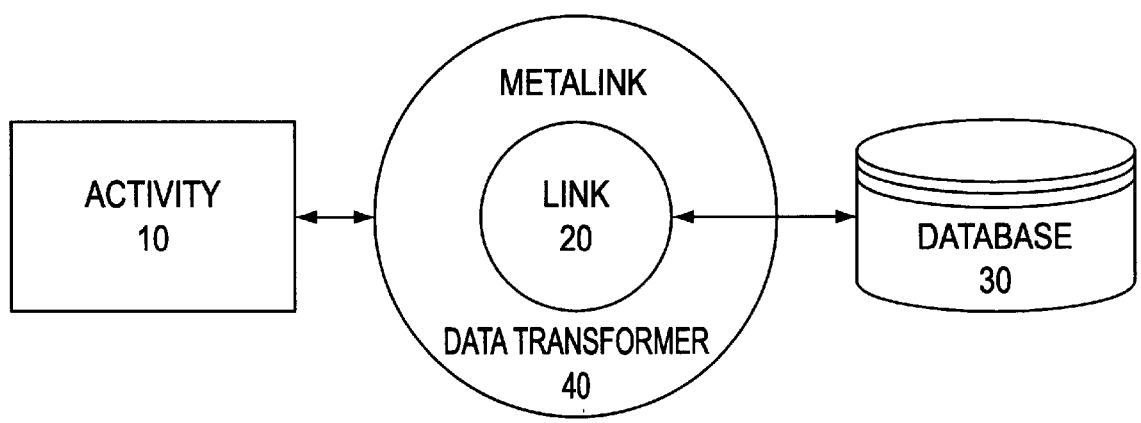
FIG. 3 is a schematic diagram of the operation of a data transformer for one embodiment of the present invention.
Figure 4:
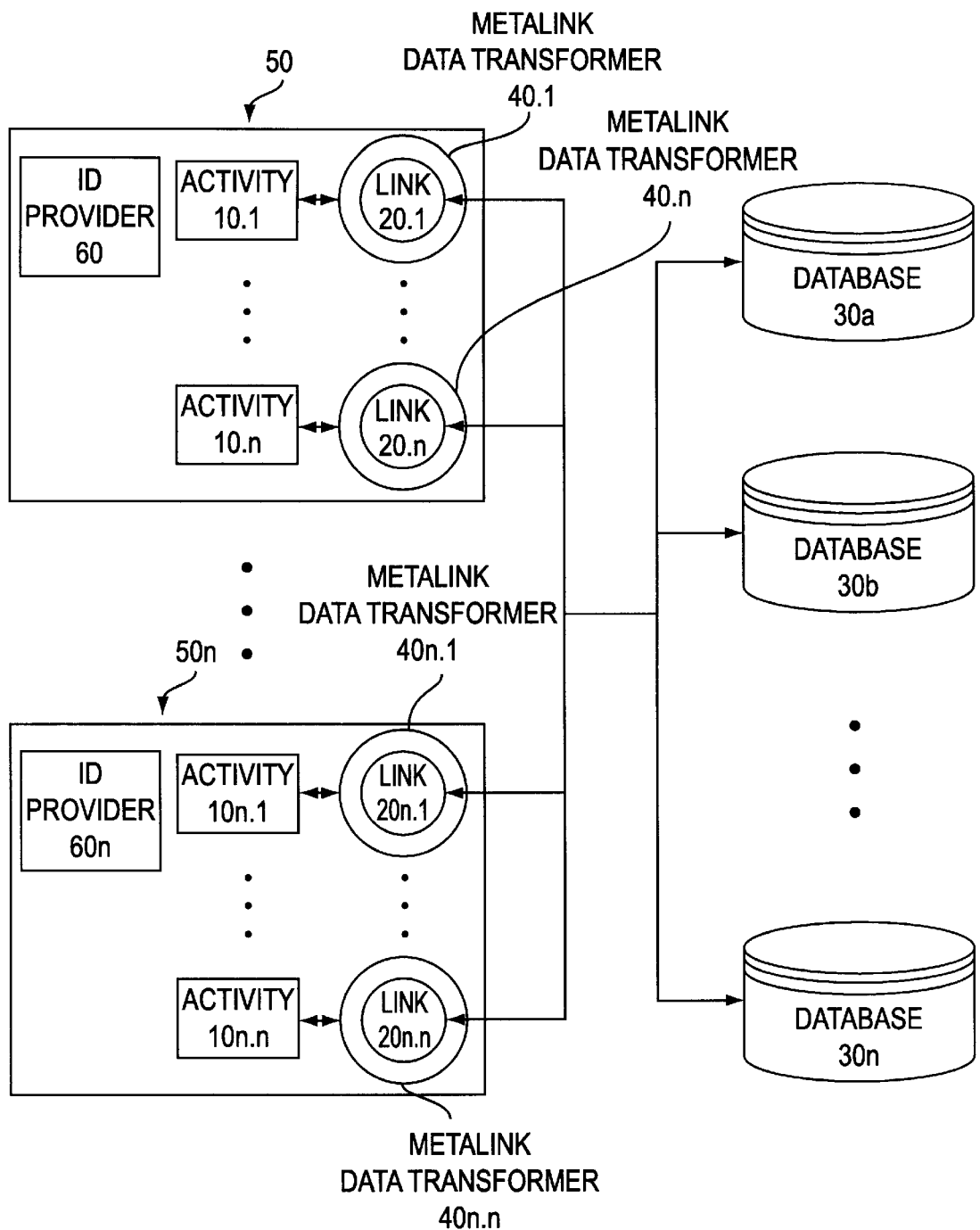
FIG. 4 is a database access system according to one embodiment of the present invention.

As shown in FIG. 3, according to the present invention, a data transformer is provided. A data transformer (termed a "MetaLink") is an object that operates between a data provider/consumer (Link) and a data manipulator (Activity). Such a MetaLink preferably may be used in a database accessing system similar to the one described above in FIG. 2., as for example depicted in FIG. 4. wherein MetaLinks 40.1 through 40.n and 40n.1 through 40n.n are shown interposed between the respective Activity and Link. A MetaLink is an object which may be imposed between the Activity and Link without requiring a change in behavior of either the Activity or the Link, but changes the behavior of the overall system. To not change the behavior of the Activity or the Link, the MetaLink may be designed to look like a Link from an Activity's point of view (i.e., it exposes the same functional entry points as a Link), and to look like an Activity from a Link's point of view (i.e., it calls the standard Link entry points called by an Activity). Thus, FIG. 3 depicts a Link "wrapped" by a MetaLink (represented as a concentric circle).

Typically, an Activity loads a Link object by an identifier, which can be a numeric handle, a name, or other suitable identifier. When the Activity is provided by the system's user with the identifier of a MetaLink instead of that Link, then the Activity provides that identifier which loads the MetaLink instead of the Link (unbeknownst to the Activity).

Figure 3A:
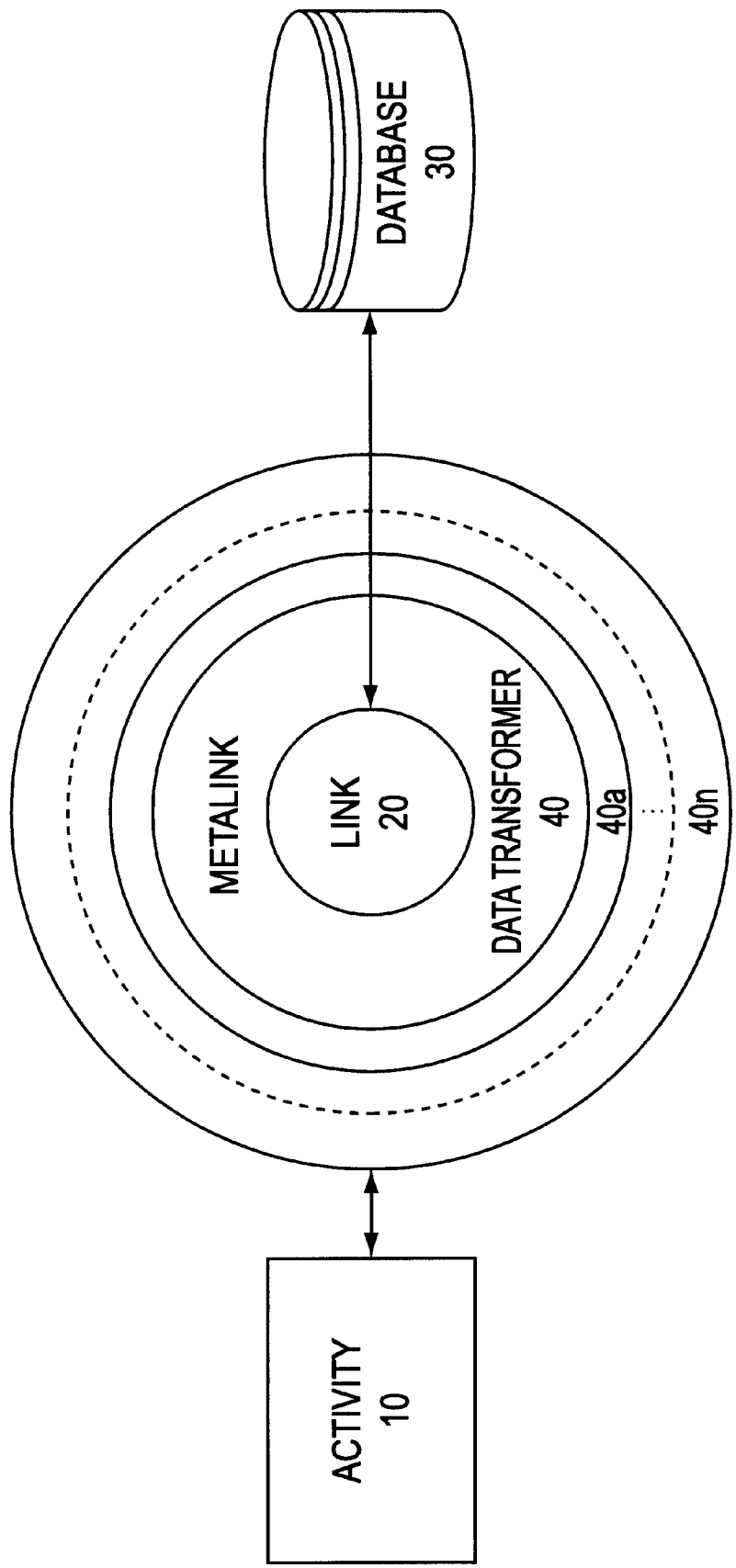
FIG. 3A is a schematic diagram according to one embodiment of the invention demonstrating multiple levels of data transformers.

The MetaLink, in turn, has been defined by the system user to point to a particular Link (or Links) by identifier, and on being loaded by the Activity, the MetaLink then loads the underlying Link(s). This scheme also allows for the MetaLink to have been provided with the identifier of vet another MetaLink, and so on, resulting in a cascade where multiple MetaLinks may be between an Activity and a Link. This is depicted schematically in FIG. 3A, where additional concentric MetaLinks 40a–40n Arap around Link 20. A single MetaLink may also concurrently load multiple Links or MetaLinks.

The behavior of the MetaLink defines how it operates. A MetaLink may receive requests (function calls) intended for a Link (because, the MetaLink was loaded by the Activity in place of the Link). The MetaLink then decides which Activity calls it will operate upon. For example, a MetaLink may decide which Activity calls to pass through and which calls to handle itself. This decision may be implemented by computer coding. For example, by a hard-coded functionality based upon the MetaLink's intended purpose. For a MetaLink to perform the intended functionality, code may be written to handle certain calls in accordance with the intended functionality. Those calls which are not part of the behavior of a given MetaLink may be passed through to the underlying Link (or, alternatively, to another MetaLink). For a given MetaLink the calls handled or passed do not change from usage to usage. Similarly, the MetaLink may decide how to process returned results. For example, the MetaLink may decide which returned results may pass directly to the Activity (or subsequent MetaLink). Again, this decision may be implemented by computer coding. For example, by a hard-coded functionality based upon the MetaLink's intended purpose. Other calls may be handled internally in the MetaLink, or with calls to one or more underlying Links.

To provide an example, consider a system having two types of databases. In such a system, one database (database A) orders the hyphen (-) before the slash (/) and the second database (database B) does the opposite. The Link into database A provides sorted results differently than a Link into database B. Therefore, an Activity calling these Links to access sorted data from both databases would receive inconsistent results. One solution is to modify all existing Links or all existing Activities which can access and order the data from these two different data bases. For example, a system may support five Activities and five Links. To accommodate the different ordering schemes all of the existing five Links would have to be modified. Alternatively, a single MetaLink may be added. Adding a single MetaLink instead of modifying existing Links significantly reduces the amount of additional code and number of modifications to existing objects (e.g., Links and Activities).

According to the present invention, a MetaLink may be provided. In this embodiment, the system may use standard Links and a single MetaLink, reducing the number of required modifications to one (i.e., the addition of the MetaLink). One example of a MetaLink, an Order MetaLink, may call a Link associated with each database type. The MetaLink then is programmed to reorder the data provided by the Links before passing it on to the Activity. All of this occurs without either the Links or the Activity having to be changed. The only change is the identifier provided by the user to the Activity.

Table 1 provides an example of the processes performed by one embodiment of the invention. In this example the Activity call to the Order MetaLink and the Order MetaLink call to Links are listed along with the Order MetaLink behavior. The Order MetaLink, one example of a MetaLink, has the effect of re-ordering the results read from a Link. This can be necessary when (1) ordering is not supported by the Link, (2) consistent ordering across Links with different ordering algorithms is obtained by using this MetaLink on both, or (3) re-ordering of results based on a particular sorting direction, type, or character set is required. Table 1 shows the basic calls from Activity to MetaLink, and MetaLink to Link.

TABLE 1

Example - Order MetaLink:

| Activity call to MetaLink | MetaLink call to Link(s) | MetaLink Behavior |
|---|---|---|
| Initialize | (none) | Handle internally |
| SetProperty (Link identifier*) | Initialize | Load Link |
| SetProperty (multiple times) | SetProperty or (none) | handle OR pass through |
| Connect | Connect | pass through |
| Select | Select | pass through |
| Fetch | Fetch multiple times until no more records return first result record | fetch and order ALL results and return first record |
| Fetch | (none) | return next result record |
| ... | ... | ... |
| Fetch | (none) | return last result record |
| Disconnect | Disconnect | pass through |
| Terminate | Terminate | pass through and internal |

While it may seem that, at the SetProperty (Link Identifier*) call, the Link identifier for the MetaLink to load is coming from the Activity, it is not—the Link Identifier may be automatically loaded by the product infrastructure from the MetaLink definition previously created by the user.

This is only one particular MetaLink. Other MetaLinks can have completely different behavior and actions, connecting to multiple Links, intercepting other operations, etc. The overall operation of each MetaLink is to provide additional functionality and/or seamless homogeneity of results from existing Links while reducing the amount of additional code needing to be written and code modules requiring modification.

Figure 5:
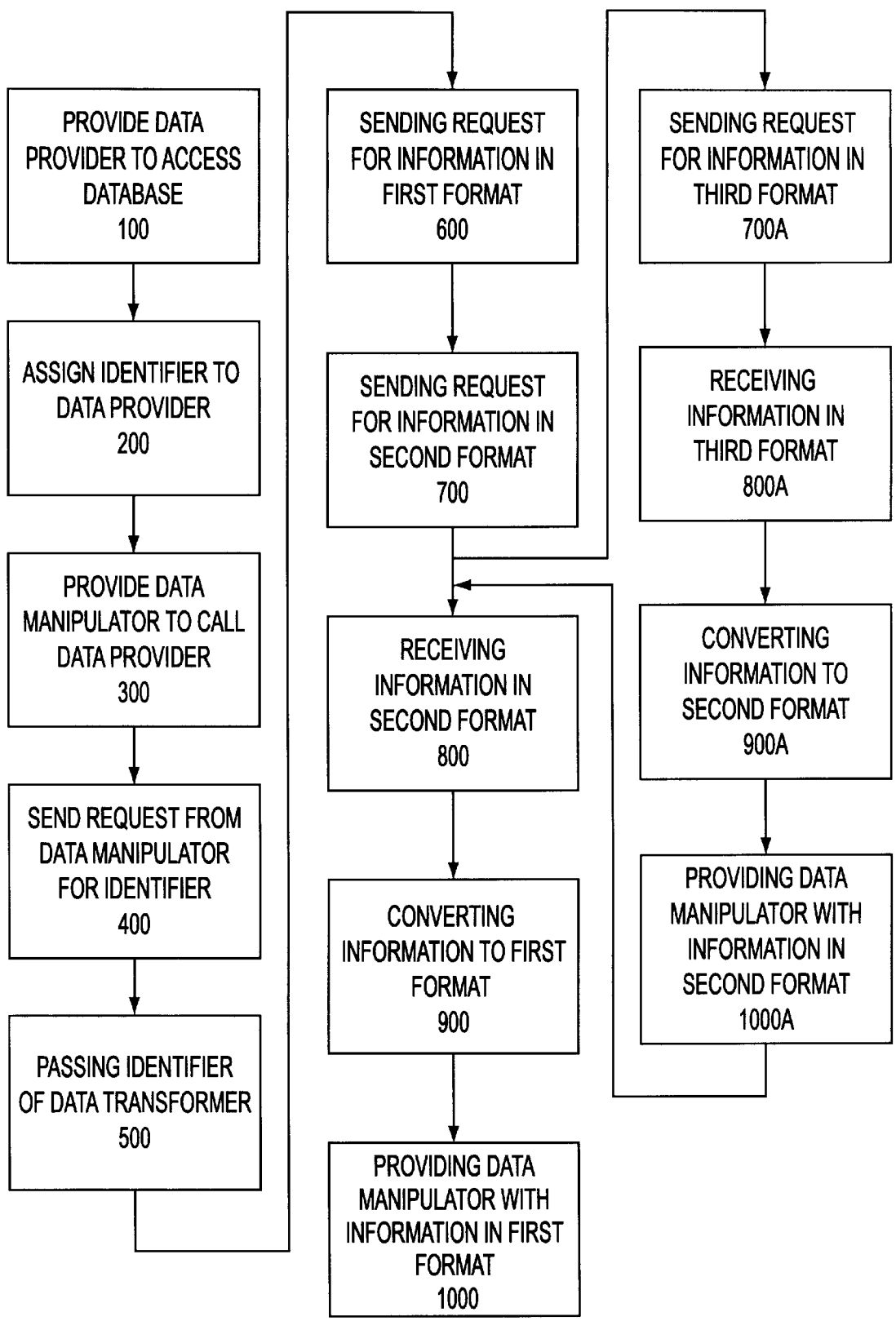
FIG. 5 is a schematic flow diagram illustrating the method of one embodiment of the present invention.

FIG. 5 shows a schematic flow diagram indicating the method of operation for one embodiment of the present invention. FIG. 5 shows, a method of accessing data from one or more databases, wherein the one or more databases have information stored in a predetermined format. In method step 100 there is provided one or more data providers for accessing information stored in at least one of the databases, each data providers having a set of predetermined entry points. In step 200 there is assigned a unique identifier to each data provider. In step 300 there is provided one or more data manipulators for calling the one or more data providers by its unique identifier. In step 400 a request is sent from the data manipulator for the unique identifier associated with a data provider which the data manipulator is designed to call. In step 500 the data manipulator is passed the unique identifier of a data transformer instead of the data provider, the data transformer having the same set of predetermined entry points as the data provider which the data manipulator was designed to call.

The method may further comprise step 600 wherein a request is sent for information in a first specific format from a data manipulator to the data transformer using the unique identifier of the data transformer. In step 700 a request is sent for information in a second specific format from the data transformer to the data provider using the unique identifier of the data provider. In step 800 information is received in the second specific format from the data provider at the data transformer. In step 900 the information received is converted from the second specific format to the first specific format. In step 1000 the data manipulator is provided with the information in the first specific format.

The method may further comprise the steps 700A–1000A shown in FIG. 5. In step 700A a request is sent for information in a third specific format from the other data transformer to a data provider using the unique identifier of the data provider. In step 800A information in the third specific format is received from the data provider at the other data transformer. In step 900A the information received in the third specific format is converted to the second specific format. In step 1000A the data transformer is provided with the information in the second specific format. This may, of course, be repeated as many times for as many formats as desired, with conversions being performed as necessary until at step 1000 the data manipulator is provided with the information in the original (first) format requested.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A system for accessing data from a database comprising:

one or more databases storing information in a predetermined format;

one or more data providers for accessing information stored in at least one of the databases, each data provider having a set of predetermined entry points and having a unique identifier assigned;

one or more data manipulators, which call a particular data provider by its identifier and provide the data provider with the set of predetermined entry points associated with that particular data provider, and which performs some manipulation on the information provided by the data providers; and one or more data transformers which intercept function calls intended by data manipulators for data providers and provide the data manipulator the information requested in the format requested, said data transformer having a unique identifier and the same entry points as the data provider of which it intercepts said function calls.

2. The system for accessing data from a database of claim 1, further comprising:

an identifier provider which provides the data manipulators with identifiers of the data providers, and wherein the data transformer intercepts the function calls to one or more data providers when the identifier provider provides the identifier of the data transformer instead of the data provider.

3. The system for accessing data from a database of claim 2, wherein said one or more data transformers call said one or more data providers by their identifier.

4. The system for accessing data from a database of claim 2 wherein said data transformer calls at least one other data transformer by its identifier.

5. The system for accessing data from a database of claim 1 wherein said one or more data transformers perform some of the tasks that said one or more data providers cannot provide.

6. A method of accessing data from one or more databases, said one or more databases having information stored in a predetermined format, said method comprising:

providing one or more data providers for accessing information stored in at least one of said databases, each data providers having a set of predetermined entry points;

assigning a unique identifier to each data provider;

providing one or more data manipulators for calling said one or more data providers by its unique identifier with a function call;

sending a request from the data manipulator for the unique identifier associated with a data provider which the data manipulator is designed to call; and passing the data manipulator the unique identifier of a data transformer instead of the data provider, said data transformer having the same set of predetermined entry points as the data provider which the data manipulator was designed to call.

7. The method of claim 6 further comprising the steps of:

sending a request for information in a first specific format from a data manipulator to the data transformer using the unique identifier of the data transformer;

sending a request for information in a second specific format from the data transformer to the data provider using the unique identifier of the data provider;

receiving information in the second specific format from the data provider at the data transformer;

converting the information received in the second specific format to the first specific format; and providing the data manipulator with the information in the first specific format.

8. The method of claim 6 further comprising the steps of:

sending a request for information in a first specific format from a data manipulator to the data transformer using the unique identifier of the data transformer;

sending a request for information in a second specific format from the data transformer to another data transformer using the unique identifier of the other data transformer;

sending a request for information in a third specific format from the other data transformer to a data provider using the unique identifier of the data provider;

receiving information in the third specific format from the data provider at the other data transformer;

converting the information received in the third specific format to the second specific format;

providing the data transformer with the information in the second specific format;

receiving information in the second specific format from the data provider at the data transformer;

converting the information received in the second specific format to the first specific format; and providing the data manipulator with the information in the first specific format.

9. A system for accessing an information set from at least two databases, the system comprising:

two or more databases which deliver the information set in two or more predetermined database formats;

one or more data providers for accessing the information set stored in each of the two or more databases, wherein each of the data providers has a set of predetermined entry points;

at least one activity which is designed to receive the information set in a predetermined activity format;

one or more data transformers which are designed to:
intercept a function call by each of the at least one activities to the two or more databases;
modify the function call of each of the at least one activities to comply with each set of predetermined entry points of each of the one or more data providers;
intercept a return to the function call of each of the at least one activities wherein the information set is in two or more predetermined database formats; and
modify the return to the function call of each of the at least one activities to comply with the predetermined activity format of each of the at least one activities.

10. The computer usable medium of claim 9 further comprising:

computer readable code for sending a request for information in a first specific format from a data manipulator to the data transformer using the unique identifier of the data transformer;

computer readable code for sending a request for information in a second specific format from the data transformer to the data provider using the unique identifier of the data provider;

computer readable code for receiving information in the second specific format from the data provider at the data transformer;

computer readable code for converting the information received in the second specific format to the first specific format; and computer readable code for providing the data manipulator with the information in the first specific format.

11. A computer usable medium having computer readable program code embodied therein for accessing data on a computer-based data accessing system, the data accessing system comprising one or more databases having information stored in at least one predetermined format, the computer readable code in said computer usable medium comprising:

computer readable code for providing at least one data provider for accessing information stored in at least one database, each data provider having a set of predetermined entry points and a unique identifier;

computer readable code for providing at least one data manipulator to call a data provider by its unique identifier with a function call;

computer readable code for sending a request from the data manipulator for the unique identifier associated with the data provider which the data manipulator is designed to call; and computer readable code for passing the data manipulator the unique identifier of a data transformer instead of the data provider, said data transformer having the same set of predetermined entry points as the data provider which the data manipulator was designed to call.

12. The computer useable medium of claim 11 further comprising:

computer readable code for providing an identifier provider to provide identifiers to the at least one data manipulator; and computer readable program code responsive to the identifier provider code for enabling the at least one data manipulator to select a data transformer in accordance with its transformer identifier or a data provider in accordance with its data provider identifier.

13. A computer usable medium having computer readable program code embodied therein for accessing data on a computer-based data accessing system, the data accessing system comprising one or more databases, one or more data providers each having a unique identifier and a set of predetermined entry points, one or more data manipulators, and one or more data transformers, the computer readable code in said computer usable medium comprising:

computer readable program code for causing a particular data provider to access information stored in at least one database;

computer readable program code for causing a data manipulator to call the particular data provider by its identifier, provide the particular data provider with its set of predetermined entry points, and retrieve information from the particular data provider;

computer readable code for causing the data manipulator to perform some manipulation on the information provided by the particular data provider; and computer readable program code for causing a data transformer to intercept a function call intended by the data manipulator for the particular data provider and provide the data manipulator the information requested, the data transformer having a unique identifier and the same entry points as the data provider of which it intercepts function calls.

14. The computer useable medium of claim 13, wherein the data accessing system includes an identifier provider, the computer usable medium further comprising:

computer readable code for causing the identifier provider to provide identifiers to the one or more data manipulators and enabling the data manipulator to select a data transformer in accordance with its transformer identifier or a data provider in accordance with its data provider identifier in accordance with the provided identifier.

15. A system for accessing data in a database comprising:

one or more databases storing information in predetermined format;

one or more data providers for accessing information stored in at least one of the databases, each data provider having a set of predetermined entry points and having a unique identifier assigned;

one or more data manipulators, which call a particular data provider by its identifier and provide the data provider with the set of predetermined entry points associated with that particular data provider, and which performs some manipulation on the information provided by the data providers; and one or more data transformer means which intercept function calls intended by data manipulators for data providers and provide the data manipulator the information requested in the format requested, said data transformer means having a unique identifier and the same entry points as the data provider of which it intercepts function calls.

16. The system for accessing data from a database of claim 15, further comprising:

an identifier provider which provides the data manipulators with identifiers of the data providers, and wherein the data transformer means intercepts the function calls to one or more data providers when the identifier provider provides the identifier of the data transformer means instead of the data provider.

17. The system for accessing data from a database of claim 16, wherein:

said one or more data transformer means call said one or more data providers by their identifier.

18. The system for accessing data from a database of claim 16 wherein:

said data transformer means calls at least one other data transformer means by its identifier.

19. The system for accessing data from a database of claim 15 wherein:

said one or more data transformer means perform some of the tasks that said one or more data providers cannot provide.

* * * * *